United States Patent
Chao et al.

(10) Patent No.: US 9,980,135 B2
(45) Date of Patent: May 22, 2018

(54) MANAGING SECURITY FOR A MOBILE COMMUNICATION DEVICE

(71) Applicant: QUALCOMM Incorporated, San Diego, CA (US)

(72) Inventors: Hui Chao, San Jose, CA (US); Yin Chen, Campbell, CA (US); Ramin Samadani, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/262,358

(22) Filed: Sep. 12, 2016

(65) Prior Publication Data

US 2018/0077569 A1 Mar. 15, 2018

(51) Int. Cl.

| H04M 1/66 | (2006.01) |
|---|---|
| H04M 1/68 | (2006.01) |
| H04M 3/16 | (2006.01) |
| H04W 12/06 | (2009.01) |
| H04L 29/08 | (2006.01) |
| H04L 12/26 | (2006.01) |
| H04W 4/02 | (2018.01) |

(52) U.S. Cl.
CPC ............. *H04W 12/06* (2013.01); *H04L 43/16* (2013.01); *H04L 67/104* (2013.01); *H04W 4/023* (2013.01)

(58) Field of Classification Search
None
See application file for complete search history.

(56) References Cited

U.S. PATENT DOCUMENTS

| 8,935,769 | B2 | 1/2015 | Hessler | |
|---|---|---|---|---|
| 9,185,117 | B2 | 11/2015 | Grigg et al. | |
| 2007/0140145 | A1* | 6/2007 | Kumar | G06F 21/32 370/254 |
| 2012/0192251 | A1* | 7/2012 | Faiman | 726/3 |
| 2013/0031367 | A1* | 1/2013 | Mao | 713/168 |
| 2014/0208383 | A1* | 7/2014 | Anson | 726/3 |
| 2014/0237570 | A1 | 8/2014 | Shishkov et al. | |
| 2014/0289822 | A1* | 10/2014 | Wilson | 726/5 |
| 2015/0242605 | A1 | 8/2015 | Du et al. | |
| 2016/0135045 | A1 | 5/2016 | Lee et al. | |
| 2016/0277369 | A1* | 10/2016 | Lee | 726/5 |

* cited by examiner

*Primary Examiner* — Moustapha Diaby
(74) *Attorney, Agent, or Firm* — The Marbury Law Group/Qualcomm

(57) ABSTRACT

Implementations include systems and methods for managing security for a mobile communication device. In implementations, a processor of the mobile communication device may determine environment context information. The processor may receive safety information from one or more peer devices. The processor may determine an authentication requirement for the mobile communication device based on the received safety information and the determined environment context information. The processor may deny access to a function of the mobile communication device in response to determining that the determined authentication requirement is not satisfied.

18 Claims, 6 Drawing Sheets

MANAGING SECURITY FOR A MOBILE COMMUNICATION DEVICE

BACKGROUND

Security and privacy are perpetual concerns for users of mobile communication devices. As mobile communication devices are increasingly used to handle a wide variety of sensitive data, documents, and communications, the loss or compromise of a mobile communication device may prove to be a costly and time-consuming security breach.

One method of securing a mobile communication device is through authentication of the user. Some more conventional methods of authentication, such as the use of passwords, are quite common. Recent authentication systems authenticate users based on contextual information, such as the location or current network of the mobile communication device when authentication is attempted. However, systems that use authentication based on context information may be less robust and may fail when a mobile communication device moves outside of its usual context. For example, when a user travels to another location (e.g., for work or vacation), many detectable elements may change, including aspects of a user's behavior, proximate devices, geographic location, and detectable networks. Thus, ironically, at a time when device safety and authentication may be most important (since losing the mobile communication device or personal information may cause more inconvenience and damage), changes in context can render a context-based user authentication system less robust or even ineffectual.

SUMMARY

Various embodiments and implementations include methods implemented on a mobile communication device for managing security for the mobile communication device. Various embodiments and implementations may include determining, by the mobile communication device, environment context information, receiving, at the mobile communication device, safety information from one or more peer devices, determining an authentication requirement for the mobile communication device based on the received safety information and the determined environment context information, and denying access to a function of the mobile communication device in response to determining that the determined authentication requirement is not satisfied.

Some embodiments may further include characterizing the one or more peer devices, and determining a trust score for each of the one or more peer devices based on characterizations of each peer device. Some embodiments may further include applying the trust score for each of the one or more peer devices to the safety information received from the respective peer device.

In some embodiments, characterizing the one or more peer devices may include characterizing the one or more peer devices based on a physical proximity of the one or more peer devices. In some embodiments, characterizing the one or more peer devices may include characterizing the one or more peer devices based on one or more social relationship metrics of the one or more peer devices. In some embodiments, determining the authentication requirements for the mobile communication device based on the received safety information and the determined environment context information may include determining a safety score for the mobile communication device based on the received safety information and the determined environment context information, and determining the authentication requirement for the mobile communication device based on the determined safety score.

Some embodiments may further include determining a trust score for each of the one or more peer devices based on characterizations of each peer device, and applying the trust score for each of the one or more peer devices to the safety information received from the respective peer device. In some embodiments, determining a safety score for the mobile communication device based on the received safety information and the determined environment context information may include determining the safety score based on the safety information to which the respective trust score has been applied.

Some embodiments may further include determining a trust score for each of the one or more peer devices based on characterizations of each peer device, determining a safety score for the mobile communication device based on the received safety information and the determined environment context information, comparing a highest trust score to a trust score threshold, selecting the highest trust score as the safety score for the mobile communication device in response to determining that the highest trust score is greater than or equal to the trust score threshold, and selecting the determined safety score as the safety score for the mobile communication device in response to determining that the highest trust score is not greater than or equal to the trust score threshold.

Further embodiments include a mobile communication device including a radiofrequency transceiver, one or more sensors, and a processor coupled to the radiofrequency transceiver and the one or more sensors and configured with processor-executable instructions to perform operations of the embodiment methods summarized above. Further embodiments include a non-transitory processor-readable storage medium having stored thereon processor-executable software instructions configured to cause a processor to perform operations of the embodiment methods summarized above.

BRIEF DESCRIPTION OF THE DRAWINGS

The accompanying drawings, which are incorporated herein and constitute part of this specification, illustrate various implementations, and together with the general description given above and the detailed description given below, serve to explain the features of various implementations.

DETAILED DESCRIPTION

Figure 1:
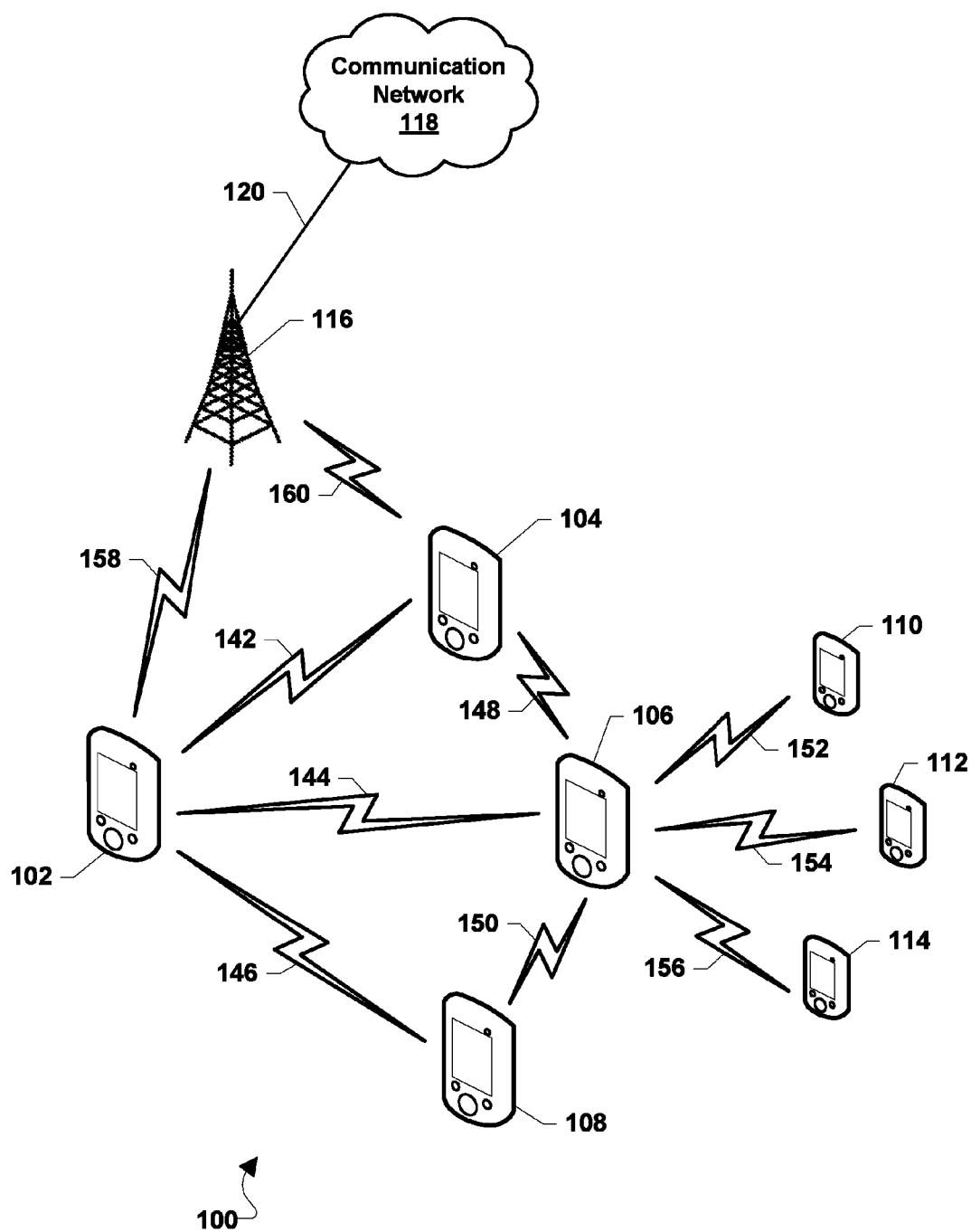
FIG. 1 is a system block diagram illustrating a communication environment in which the various implementations may be used.

Various embodiments and implementations will be described in detail with reference to the accompanying drawings. Wherever possible, the same reference numbers will be used throughout the drawings to refer to the same or like parts. References made to particular examples and implementations are for illustrative purposes, and are not intended to limit the scope of various implementations or the claims.

Various implementations provide methods and mobile communication device that implement the methods of managing security for a mobile communication device according to various implementations.

The term "computing device" refers to any programmable computer or processor that can be configured with programmable instructions to perform various implementations. A computing device may include one or all of wearable computing devices (including smart watches, necklaces, medallions, and any computing device configured to be worn, attached to a wearable item, or embedded in a wearable item), wireless accessory devices, wireless peripheral devices, cellular telephones, smartphones, tablet computers, Internet enabled cellular telephones, Wi-Fi enabled electronic devices, personal data assistants (PDAs), laptop computers, personal computers, and similar electronic devices equipped with a short-range radio (e.g., a Bluetooth, Peanut, ZigBee, and/or Wi-Fi radio, etc.) and/or a wide area network connection (e.g., using one or more cellular radio access technologies to communicate using a wireless wide area network transceiver, or a wired connection to a communication network). Reference to a particular type of computing device as being a mobile device or a wireless device is not intended to limit the scope of the claims unless a particular type of mobile device or wireless device is recited in the claims.

The term "mobile communication device" refers to any one or all of cellular telephones, smartphones, laptop computers, tablet computers, smartbooks, palmtop computers, wireless electronic mail receivers, multimedia Internet enabled cellular telephones, wireless gaming controllers, and similar electronic devices and portable computing platforms which include a programmable processor, a memory, and one or more shared RF resource chains that are configured to support communications over two or more subscriptions. Various implementations may be particularly useful in any communication devices that can support multiple wireless wide area network subscriptions and communication sessions with two or more communication networks.

The terms "component," "unit," and "system" are intended to include a computer-related part, functionality or entity, such as, but not limited to, hardware, firmware, a combination of hardware and software, software, or software in execution, that is configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Security systems that use context information may be less robust, or may even fail, when a mobile communication device moves outside of its usual context. When a user travels to another location (e.g., for work or vacation), many detectable elements used for defining context may change. For example, elements used for defining context that may change when the user travels may include aspects of a user's behavior, devices close to the mobile communication device (referred to herein as "proximate devices"), geographic location of the mobile communication device, and detectable networks. At the same time, the risk of a mobile communication device being lost or stolen is likely greater when the user travels. Thus, ironically, at a time when the safety and security of a mobile communication device is needed most and user authentication may be more important than usual, changes in context can render a context-based authentication system less robust or even ineffectual.

Various embodiments and implementations provide methods implemented by a processor on a mobile communication device for managing security on the mobile communication device. In various implementations, the processor of the mobile communication device may determine a safety score based on a variety of criteria, including information about the environment of the mobile communication device, and information provided by one or more peer devices in communication with the mobile communication device. In some implementations, based on the determined safety score, the processor of the mobile communication device may determine an authentication level that the mobile communication device may require to access one or more functions of the mobile communication device. In some implementations, based on the calculated safety score, the mobile communication device may grant or restrict access to one or more functions of the mobile communication device.

In various implementations, the information provided by the one or more peer devices may include a safety score that has been calculated by each of the one or more peer devices. In such implementations, the mobile communication device may determine its safety score based at least in part on the safety score calculated by the one or more peer devices. In some implementations, the safety score calculated by a peer device may itself be based on information and/or a safety score determined by peer devices of that device. That is, in some implementations, a peer device of the mobile communication device may detect and/or communicate with another mobile communication device that may be undetectable by the mobile communication device, or with which the mobile communication device cannot communicate (e.g., the mobile communication device may communicate with the peer device, and the peer device may communicate with another mobile communication device that is outside a communication range of the first mobile communication device). In such implementations, the mobile communication device may determine its safety score based on information and/or safety scores from one or more peer device of the mobile communication device, and information and or safety scores from one or more devices that are peers of a peer device.

In some implementations, the mobile communication device may detect one or more peer devices, such as one or more other mobile communication devices, and the mobile communication device may attempt to establish a peer-to-peer (P2P) communication links with the one or more peer devices. If the mobile communication device is unable to establish a P2P communication link with a peer device, the mobile communication device may store an indication of such peer device, for example, indicative of a trustworthiness of the peer device.

If the mobile communication device is able to establish a P2P communication link with a peer device, the mobile communication device may exchange safety information with the peer device over the P2P communication link. The safety information may include a variety of information detected by each of the peer devices, such as information about the respective environment of each peer device. The safety information may also include a peer safety score computed by each of the peer devices. In some implementations, the mobile communication device and the peer devices may exchange the safety information as an added payload to other P2P communications. In some implementations, the mobile communication device in the peer devices may exchange only the safety information, and in some cases may establish a P2P communication link for the purpose of exchanging safety information.

In some implementations, the mobile communication device may characterize each of the detected peer devices based on one or more criteria. For example, the mobile communication device may characterize a peer device based on whether the mobile communication device was able to establish a P2P communication link with the peer device. As another example, the mobile communication device may characterize a peer device based on one or more of the peer device's physical proximity, a signal strength of the P2P communication link, if any, a location of the peer device, one or more aspects of safety information received from the peer device. As another example, the mobile communication device may characterize a peer device based on one or more social relationship metrics related to the peer device that may be calculated by the mobile communication device.

In some implementations, the mobile communication device may determine a trust score for each peer device. In some implementations, the mobile communication device may apply the trust score of a peer device to information and/or a safety score received from the peer device so as to provide a weight to the information and or safety score received from the peer device.

In various implementations, the mobile communication device may determine a safety score based on information about its environment that is determined by the mobile communication device, and on information and/or one or more safety scores received from one or more peer devices. In some implementations, the mobile communication device may redetermine the safety score periodically or otherwise dynamically update the safety score.

In some implementations, the mobile communication device may determine one or more authentication requirements for the mobile communication device based on the determined safety score. In some implementations, the one or more authentication requirements may include one or more verification steps. In some implementations, determining one or more authentication requirements may include adjusting one or more authentication requirements. For example, adjusting an authentication requirement may include adding or subtracting requirements, or increasing or decreasing a level of stringency and/or frequency of one or more requirements).

In some implementations, the mobile communication device may perform a security function based on the safety score. For example, the mobile communication device may lock itself to prevent data loss. As another example, the mobile communication device may send a message, such as an alarm or notification, to a trusted device or to a communication network indicating the location of the mobile communication device. As another example, mobile communication device may grant or deny access to one or more functions or applications of the mobile communication device.

Various implementations may be implemented in mobile communication devices that may operate within a variety of communication systems particularly systems that include at least two communication networks. FIG. 1 illustrates a communication system 100 suitable for use with various implementations. A mobile communication device 102 may communicate with a communication network 118, which may include a plurality of base stations, such as base stations 116. The mobile communication device 102 may communicate with the base station 116 over a wireless communication link 158. The base station 116 may communicate with the communication network 118 over a wired or wireless communication link 120, which may include fiber optic backhaul links, microwave backhaul links and other similar communication links. In some implementations, the communication network 118 may include a mobile telephony communication network.

The mobile communication device 102 may also communicate with peer devices 104, 106, and 108, each of which may include a mobile communication device. The mobile communication device 102 may communicate with peer devices 104, 106, and 108 over a respective wireless communication link 142, 144, and 146. Each of the peer devices 104, 106, and 108 may communicate with each other over wireless communication links, e.g., wireless communication links 148 and 150. Each of the peer devices 104, 106, 108 may communicate with additional wireless communication devices. For example, the peer device 106 may communicate with wireless communication devices 110, 112, and 114 over a respective wireless communication links 152, 154, and 156. In some implementations, the wireless communication device 102 may be unable to communicate with the wireless communication devices 110, 112, and 114. Thus, the wireless communication devices 110, 112, and 114 may be peer devices of the peer device 106. In various embodiments, each of the peer devices/wireless communication devices 104-114 may communicate with the base station 116 over a wireless communication link. For example, the peer device 104 may communicate with the base station 116 over the wireless communication link 160.

The communication network 118 may support communications using one or more radio access technologies (RATs), and each of the wireless communication links between the base station 116 and a wireless communication device (e.g., the wireless communication links 158 and 160) may include two-way wireless communication links using one or more RATs. Examples of RATs may include cellular RATs such as Long Term Evolution (LTE), Global System for Mobility (GSM), Code Division Multiple Access (CDMA), Worldwide Interoperability for Microwave Access (WiMAX), Time Division Multiple Access (TDMA), Wideband CDMA (WCDMA), and other RATs. While the communication links 158 and 160 are illustrated as single links, each of the communication links 158 and 160 may include a plurality of carrier signals, frequencies or frequency bands, each of which may include a plurality of logical channels. Additionally, each of the communication links 158 and 160 may utilize more than one RAT.

Each of the wireless communication links 142-156 between wireless communication devices may include a plurality of carrier signals, frequencies, or frequency bands, each of which may include a plurality of logical channels. In some implementations, the wireless communication links 142-156 may use a device-to-device wireless communication protocol. Examples of a device-to-device wireless communication protocol include An IoT communication protocol may include LTE Direct (LTE-D), a RAT in the Institute of Electrical and Electronics Engineers (IEEE) 802 family (including Wi-Fi, ZigBee, Bluetooth, and others), Machine-Type Communication (LTE MTC), Narrow Band LTE (NB-LTE), Cellular Internet of Things (CIoT), Narrow Band IoT (NB-IoT), BT Smart, Bluetooth Low Energy (BT-LE), Institute of Electrical and Electronics Engineers (IEEE) 802.15.4, and extended range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), and Weightless, as well as one or more cellular RATs. In some implementations, the wireless communication links may include cellular RATs such as 3GPP Long Term Evolution (LTE), (Global System for Mobility) GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies. In some implementations, each of the wireless communication links 142-156 may utilize one or more RATs.

Figure 2:
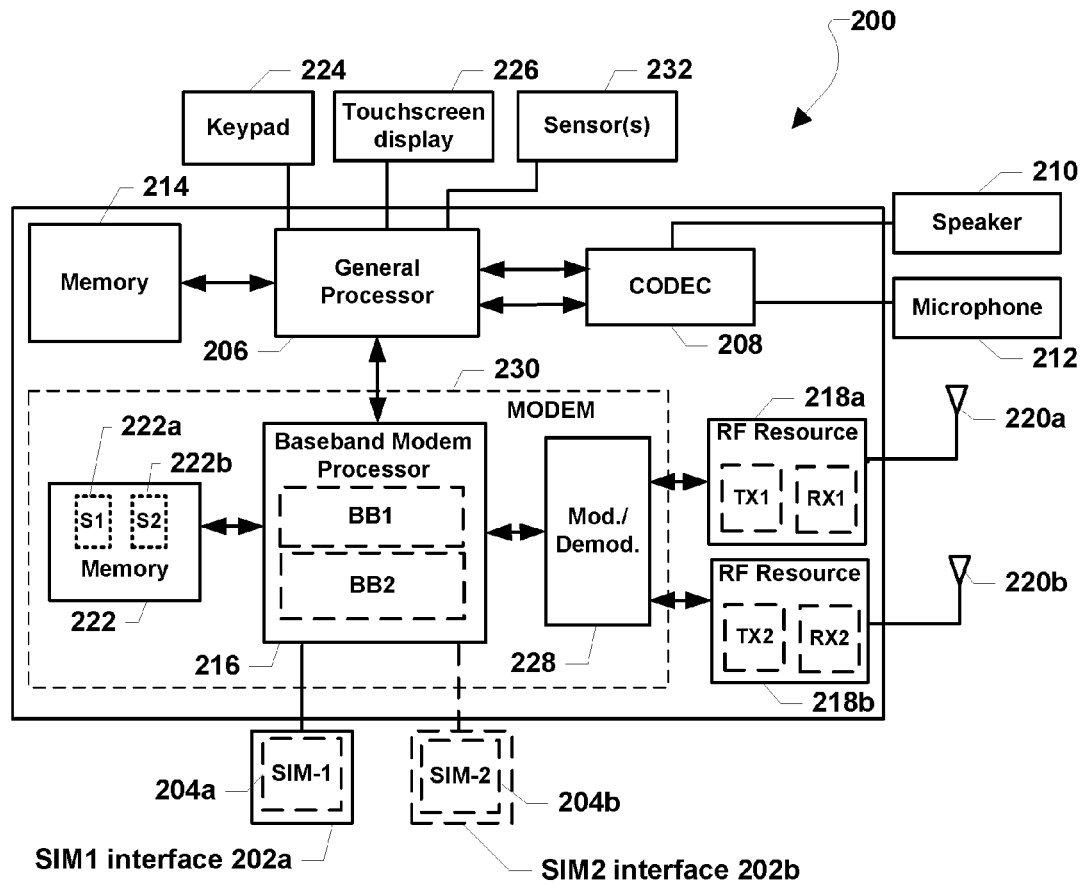
FIG. 2 is a component block diagram illustrating a mobile communication device according to various implementations.

FIG. 2 is a component block diagram of a mobile communication device 200 suitable for implementing various implementations. With reference to FIGS. 1 and 2, in various implementations, the mobile communication device 200 may be similar to the mobile communication device 102.

The mobile communication device 200 may include a first subscriber identify module (SIM) interface 202a, which may receive a first identity module SIM-1 204a that is associated with a first subscription. The mobile communication device 200 may optionally also include a second SIM interface 202b, which may receive a second identity module SIM-2 204b that is associated with a second subscription. A SIM in various implementations may be a Universal Integrated Circuit Card (UICC) that is configured with SIM and/or USIM (Universal Subscriber Identity Module) applications, enabling access to, for example, GSM and/or Universal Mobile Telecommunication System (UMTS) networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM and I/O circuits. A SIM used in various implementations may contain user account information, an international mobile subscriber identity (IMSI), a set of SIM application toolkit (SAT) commands, and storage space for phone book contacts. A SIM card may further store a Home-Public-Land-Mobile-Network (HPLMN) code to indicate the SIM card network operator provider. An Integrated Circuit Card Identity (ICCID) SIM serial number may be printed on the SIM card for identification.

The mobile communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The memory 214 may be a non-transitory computer-readable storage medium that stores processor-executable instructions. The memory 214 may store an operating system (OS), as well as user application software and executable instructions. The memory 214 may also store application data, such as an array data structure.

The general-purpose processor 206 may be coupled to a modem 230. The modem 230 may include at least one baseband modem processor 216, which may be coupled to a memory 222 and a modulator/demodulator 228. The baseband modem processor 216 may include physically or logically separate baseband modem processors (e.g., BB1, BB2). The modulator/demodulator 228 may receive data from the baseband modem processor 216 and may modulate a carrier signal with encoded data and provide the modulated signal to one or more RF resources 218a, 218b for transmission. The modulator/demodulator 228 may also extract an information-bearing signal from a modulated carrier wave received from the one or more RF resources 218a, 218b, and may provide the demodulated signal to the baseband modem processor 216. The modulator/demodulator 228 may be or include a digital signal processor (DSP).

The general-purpose processor 206 and the baseband modem processor 216 may be configured to perform a variety of operations, as further described below, including operations of the various implementations.

The general-purpose processor 206 may be coupled to one or more sensors 232 disposed in or on the wireless communication device 200. Each of the sensors 232 may include one or more of a wide variety of sensors capable of detecting a variety of information, such as cameras, optical sensors, photo optic sensors, pressure sensors, humidity sensors, temperature sensors, position sensors, acceleration sensors, vibration sensors, gyroscopes, gravimeters, pressure sensors, impact sensors, force meters, stress meters, strain sensors, fluid sensors, chemical sensors, gas content analyzers, pH sensors, radiation sensors, Geiger counters, neutron detectors, biological material sensors, radar, lidar, IR sensors, ultrasonic sensors, microphones, occupancy sensors, proximity sensors, motion sensors, and other sensors. The sensors 232 may provide sensor data to the general-purpose processor 206. In various embodiments, general-purpose processor 206 may use the sensor data to determine environmental context information of the wireless communication device 200.

The baseband modem processor 216 may read and write information to and from the memory 222. The memory 222 may also store instructions associated with a protocol stack, such as protocol stack S1 222a and protocol stack S2 222b. The protocol stacks S1 222a, S2 222b generally include computer executable instructions to enable communication using a radio access protocol or communication protocol. Each protocol stack S1 222a, S2 222b typically includes network protocol layers structured hierarchically to provide networking capabilities. The modem 230 may include one or more of the protocol stacks S1 222a, S2 222b to enable communication using one or more RATs. The protocol stacks S1 222a, S2 222b may be associated with a SIM card (e.g., SIM-1 204a, SIM-2 204b) configured with a subscription. For example, the protocol stack S1 222a and the protocol stack S2 222b may be associated with the SIM-1 204a. The illustration of only two protocol stacks S1 222a, S2 222b is not intended as a limitation, and the memory 222 may store more than two protocol stacks (not illustrated).

Each SIM and/or RAT in the mobile communication device 200 (e.g., SIM-1 204a, SIM-2 204b) may be coupled to the modem 230 and may be associated with or permitted to use an RF resource. The term "RF resource" is used herein to refer to all of the circuitry used to send and receive RF signals, which may include the baseband modem processor 216 that performs baseband/modem functions for communicating with/controlling a RAT, one or more radio units including transmitter and receiver components that are shown as RF resources 218a, 218b (e.g., in FIG. 2), one or more of the wireless antennas 220a, 220b, and additional circuitry that may include one or more amplifiers and radios. In some implementations, an RF resource may share a common baseband modem processor 216 (i.e., a single device that performs baseband/modem functions for all RATs on the multi-subscription communication device). In some implementations, each RF resource may include the physically or logically separate baseband processors (e.g., BB1, BB2).

The RF resources 218a, 218b may be transceivers associated with one or more RATs and may perform transmit/receive functions for the mobile communication device 200 on behalf of their respective RATs. The RF resources 218a, 218b may include separate transmit and receive circuitry. In some implementations, the RF resource 218b may include only receive circuitry. The RF resources 218a, 218b may each be coupled to a wireless antenna (e.g., the first wireless antenna 220a and the second wireless antenna 220b). The RF resources 218a, 218b may also be coupled to the baseband modem processor 216.

In some implementations, the general-purpose processor 206, memory 214, baseband processor(s) 216, and the RF resources 218a, 218b may be included in the mobile communication device 200 as a system-on-chip. In some implementations, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the mobile communication device 200 may include, but are not limited to, a keypad 224 and a touchscreen display 226.

In some implementations, the keypad 224, the touchscreen display 226, the microphone 212, or a combination thereof may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or receive a telephone number. As another example, the request to initiate the outgoing call may be in the form of a voice command received via the microphone 212. Interfaces may be provided between the various software modules and functions in the mobile communication device 200 to enable communication between them.

Functioning together, the two SIMs 204a, 204b, the baseband processor(s) 216, RF resources 218a, 218b and the antennas 220a, 220b may enable communications on two or more RATs. For example, one SIM, baseband processor and RF resource may be configured to support two different RATs. In other implementations, more RATs may be supported on the mobile communication device 200 by adding more SIM cards, SIM interfaces, RF resources, and antennas for connecting to additional mobile networks.

Figure 3A:
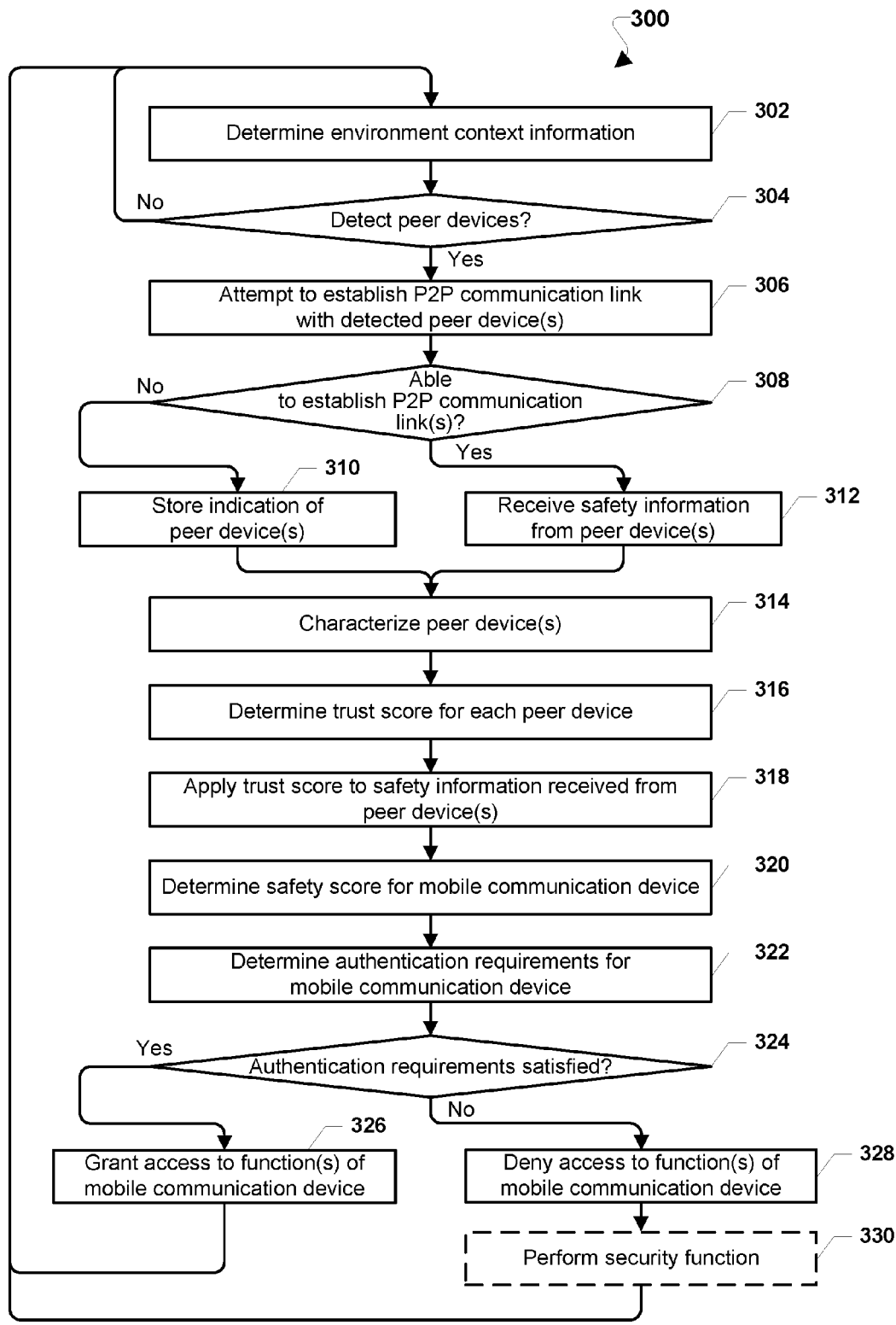
FIGS. 3A and 3B are process flow diagrams illustrating methods of managing security for mobile communication device according to various implementations.

FIG. 3A is a process flow diagram illustrating a method 300 for managing security for a mobile communication device according to some implementations. With reference to FIGS. 1-3A, the method 300 may be implemented by a processor (such as the general-purpose processor 206, the baseband processor 216, or another similar processor) of a mobile communication device (such as the mobile communication devices 102 and 200).

In block 302, the processor of the mobile communication device (a "device processor") may determine environment context information. For example, the device processor may receive sensor data from one or more sensors (such as the sensor(s) 232), and based on the sensor data device processor may determine the environment context information. Examples of the sensor data may include any type of data detectable by the one or more sensors. In various embodiments, examples of the environment context information may include a location of the wireless device, a position of the wireless device, date and time information, a time zone in which the wireless communication device is located. The environment context information may also include ambient light conditions, sound conditions, vibrations, motion, temperature, humidity, and a variety of other ambient conditions. The environment context information may also include images of one or more objects, signs, or symbols that the device processor may recognize, for example, using image analysis or character recognition. The environment context information may also include one or more sounds or sound information (such as words, audio machine communication, or other sound in which information may be encoded) that the device processor may recognize, for example, using sound, language, or speech recognition or analysis.

In determination block 304, the device processor may determine whether one or more peer devices are detected. For example, the device processor may detect one or more RF communication signals from one or more detected peer devices, such as the peer devices 104, 106, 108.

In response to determining that no peer device are detected (i.e., determination block 304="No"), the device processor may continue to determine environment context information in block 302.

In response to determining that one or more peer devices are detected (i.e., determination block 304="Yes"), the device processor may attempt to establish a peer-to-peer (P2P) communication link with the one or more peer devices in block 306. In some implementations, the device processor may attempt to establish a P2P communication link with one, some, or all of the peer devices.

In determination block 308, the device processor may determine whether the processor is able to establish a P2P communication link (such as the wireless communication links 142, 144, and 146) with the one or more peer devices.

In response to determining that the processor is unable to establish a P2P communication link with one or more peer devices (i.e., determination block 308="No"), the device processor may store an indication of such peer device, for example, indicating that the processor was unable to establish a P2P communication link with such peer device(s) in block 310. In some implementations, the processor may use the indication that the processor was unable to establish a P2P communication link with a peer device in a characterization of the peer device, and/or in a determination of a trust score for such peer device, as further described below.

In response to determining that the processor is able to establish a P2P communication link with one or more peer devices (i.e., determination block 308="Yes"), the device processor may receive safety information from the one or more peer devices in block 312. For example, the wireless communication device 102 may receive safety information from one or more of the peer devices 104, 106, 108. In some implementations, the device processor may also send safety information from the mobile communication device to a peer device.

In some implementations, the safety information received by the device processor may include a variety of information detected by a peer device, such as information about the environment of the peer device. For example, a peer device may include one or more sensors that may be analogous to, for example, the sensors 232 of the mobile communication device. In such implementations, the received safety information may include information from one or more sensors of the peer device.

In some implementations, the safety information received by the device processor may include a safety score determined by the peer device. In some implementations, the device processor may receive the safety information as an payload added to or included with other P2P communications. In some implementations, the mobile communication device and the peer devices may exchange the safety information separate from other P2P communications. In some implementations, the mobile communication device and the peer device may establish a P2P communication link for the purpose of exchanging safety information.

In some implementations, the safety information provided by a peer device may include a safety score has been calculated by each of the one or more peer devices. In such implementations, the mobile communication device may determine its safety score based at least in part on the safety score calculated by the one or more peer devices.

In some implementations, the safety score calculated by a peer device may itself be based on information and/or a safety score determined by peer devices of the peer device. For example, the peer device 106 may communicate with one or more peer devices 110, 112, and 114. In some implementations, a peer device of the mobile communication device may detect and/or communicate with another mobile communication device that may be undetectable by the mobile communication device, or with which the mobile communication device cannot communicate. For example, the wireless communication device 102 (e.g., a first mobile communication device) may be able to detect and/or communicate with the peer devices 104, 106, and 108 (e.g., each a second mobile communication device), but the wireless communication device 102 may be unable to detect and/or communicate with the peer devices 110, 112, and 114 (e.g., each a third mobile communication device). In such implementations, the mobile communication device (e.g., the mobile communication device 102) may determine its safety score based on information and/or safety scores from one or more peer devices of the mobile communication device (e.g., the peer devices 104, 106, and 108), and information and/or safety scores from one or more devices that are peers of a peer device (e.g., the peer devices 110, 112, and 114).

In block 314, the device processor may characterize each of the one or more peer devices. In some implementations, the device processor may characterize each of the detected peer devices based on one or more criteria. In some implementations, the device processor may characterize a peer device based on the physical proximity of one or more of the peer devices to the mobile communication device. In some implementations, the device processor may evaluate a peer device's physical proximity using a variety of criteria.

In some implementations, the device processor may characterize the peer device based on one or more social relationship metrics. For example, the device processor may determine and evaluate a social relationship between the mobile communication device and the peer device. In some implementations, the device processor may determine and evaluate a social relationship between the mobile communication device and the peer device based on a variety of criteria.

The operations of block 314 are further described below with reference to FIG. 4.

In block 316, the device processor may determine a trust score for each peer device. In some implementations, the device processor may determine the trust score for each detected peer device based on characterizations of each peer device performed in block 314. In some implementations, the device processor may determine a trust score for a peer device whether or not the device processor receives safety information from the peer device. In some implementations, the device processor may determine the trust score for a peer device based on the ability or inability to receive safety information from a peer device, or whether or not the device processor was able to establish a P2P communication link with the peer device.

In block 318, the device processor may apply the determined trust score to the safety information received from each of the one or more peer devices. In some implementations, the mobile communication device may apply the trust score of a peer device to information and/or a safety score received from a peer device so as to provide a weight to the information and or safety score received from the peer device. By applying the trust score of a peer device to the safety information from that peer device, the device processor may provide greater weight to safety information provided by peer devices that are determined to be more trustworthy, and may provide less weight to safety information from less trustworthy devices.

In block 320, the device processor may determine a safety score for the mobile communication device. In various implementations, the device processor may determine the safety score of the mobile communication device based on an aggregation of information detected and received (or not received) by the mobile communication device. In some implementations, the device processor may determine the safety score based on the environment context information determined by the device processor. In some implementations, the device processor may determine the safety score based on the safety information received from one or more peer devices. In some implementations, the device processor may determine the safety score based on the safety information received from one or more peer devices that is weighted according to the trust score determined for each of the one or more peer devices. In various implementations, the device processor may determine the safety score based on a combination of any of the environment context information and the safety information (whether or not the device processor applies the trust score(s) to the received safety information). In some implementations, the safety score may be an indication of the relative security of the mobile communication device, such as "safe," "moderately safe," "not safe," "stolen" (i.e., the mobile committees device has been stolen), or another similar indication. In some implementations, the safety score may be a numerical score, a letter grade, may exist on a sliding scale, or another similar indication of the security of the mobile communication device.

In some implementations, the device processor may determine a safety score $S_i$ that represents a degree of safety in the environment surrounding a particular mobile communication device (which may be designated as i). In some implementations, the safety score $S_i$ for a particular mobile communication device i may range from $\{-1, 1\}$, in which a higher value of $S_i$ represents a safer environment. For example, a default value of $S_i$ may be set at 0.25, whereas in a highly safe environment, such as at home, $S_i$ may be set at a high value such as 0.9. In some implementations, the device processor may also receive a safety score that is calculated by a peer device (e.g., one or more of the peer devices 104, 106, and 108).

In some implementations, the device processor may determine a trust score w(i,j) that represents a degree to which a peer device j may be trusted ("trustedness"). In some implementations, the trust score may range from {0, 1}, in which a higher value of w(i,j) represents greater trustedness. For example, a peer device j that is associated with a family member or close friend may be associated with a trust score of 1, while a peer device j that is associated with a friend that is less well known may be associated with a trust score of 0.7. As another example, a peer device j that is associated with an acquaintance may be associated with a trust score of 0.3. In some implementations the device processor may determine the trust score w(i,j) using machine learning methods, such as linear regression, based on, for example, one or more social relationship metrics, as further described below.

In some implementations, the device processor may determine a weight u(i,m) that represents an unfamiliarity of an unrecognized device m (e.g., unrecognized by the mobile communication device i). In some implementations, the weight may range from {0,1}, in which a higher value represents greater distrust or unfamiliarity. In some implementations, the weight may represent a counterbalance or an opposite of the trust score w(i,j). The weight u(i,m) may also represent a degree of insecurity regarding or within an environment of the mobile communication device i. For example, in a work environment, the weight u(i,m) may be set at a small value, such as 0.1, while in an unsafe environment, the weight u(i,m) may be set at a high value, such as 1. In some implementations, the weight u(i,m) may be set at a constant value for all devices that are not recognized by the mobile communication device i (i.e., "unrecognized devices"). In some implementations, the value of the weight u(i,m) may be set by a user.

In some implementations, the device processor may determine a beacon signal strength b(i,j) that represents a signal strength of a signal from each peer device j received by mobile communication device i. In such implementations, the device processor may determine an average beacon signal strength $C_b$ that the device processor of the mobile communication device i receives. In some implementations, Cb may represent an average beacon signal strength of a typical environment.

In some implementations, the device processor may determine the safety score $S_i$ for the mobile communication device i based on the trust score w (i,j) of each peer device j, the weight u(i,m) of each unrecognized device m, the beacon signal strength b(i,j) of each peer device j, and the average beacon signal strength Cb.

For example, the device processor of the mobile communication device i may detect a friendly peer device j, and may receive a safety score $S_j$ from the peer device j. The mobile communication device i may determine a trust score of w(i,j) for the peer device j. The mobile communication device i may also detect a total of N friendly peer devices. The device processor may further detect an unrecognized device m, for which the device processor may determine a weight u(i,m). The device processor of the mobile communication device i may start with a default safety score of 0.25. In some implementations the device processor may use these values to determine the safety score $S_i$ according to the following equation (1):

$$S_i = \frac{\Sigma_j s_j w(i,j) b(i,j) - \Sigma_m u(i,m) b(i,m)}{\Sigma_j s_j C_b + \Sigma_m C_b} \quad \text{[Equation 1]}$$

For example, the mobile communication device i may be in an environment near devices associated with close friends, so that each peer device is associated with a trust score w(i,j)=1. Further, the device processor of the mobile communication device i may detect no unknown devices. In some implementations, each mobile communication device (e.g., the mobile communication device and all peer devices) may start with a default safety score of 0.25. When the device processor of the mobile communication device i detects a peer device, the device processor may update its own safety score according to the following equation (2):

$$S_i = \frac{\Sigma_j b(i,j)}{NC_b} \sim = 1 \quad \text{[Equation 2]}$$

If the average signal strength of signals that the device processor receives is equal to Cb, such that $\Sigma_j b(i,j) = NC_b$, then the device processor may determine that $S_i = 1$. If the average signal strength of signals that the device processor receives is greater than Cb, such that $\Sigma_j b(i,j) > C_b$, then the device processor may determine that $S_i > 1$. If the average signal strength of signals that the device processor receives is less than Cb, such that $\Sigma_j b(i,j) < C_b$, then the device processor may determine that $S_i < 1$. Because the signal strength of a signal that the device processor receives from a peer device is inversely proportional to the distance between the mobile communication device and the peer device, if all peer device(s) detectable by the device processor are friendly devices (e.g., are associated with a high trust score), the device processor may determine a relatively high safety score.

As another example, the mobile communication device i may be in an environment near one or more devices that the device processor does not recognize, and the device processor may detect no friendly devices. In such a situation, if the unrecognized peer devices are in close proximity to the mobile communication device (i.e., the signal strength of signals received from the unrecognized peer device(s) is high) the device processor may determine the safety score $S_i$ according to the following equation (3):

$$S_i = \frac{-\Sigma_m u(i,m) b(i,j)}{\Sigma_m C_b} = -1 \quad \text{[Equation 3]}$$

The value of Si=−1 may represent a very unsafe environment. In cases in which the unrecognized peer device(s) are farther away from the mobile communication device (i.e., the signal strength of signals received from the unrecognized peer devices is lower than in the example above), the device processor may determine a value of Si>−1, which may represent a somewhat unsafe environment.

In block 322, the device processor may determine one or more authentication requirements for the mobile communication device. In some implementations, the device processor may determine the one or more authentication requirements based on the determined safety score for the mobile communication device. In some implementations, the one or more authentication requirements may include one or more verification steps. In some implementations, determining one or more authentication requirements may include adjusting one or more authentication requirements or processes. For example, adjusting an authentication requirement may include adding or subtracting requirements for successful authentication (e.g., adding a requirement for an iris scan), or increasing or decreasing a level of stringency and/or frequency of user authentication processes (e.g., requiring two or more independent authentication measures, such as requiring both fingerprint and passcode verifications).

For example, based on the determined safety score, the device processor may lock the mobile communication device (e.g., require a password, go to a lock screen, and the like) after a period of time during which the device processor detects no user interaction with the mobile communication device. In some implementations, the device processor may adjust the period of time based on the safety score. As another example, the device processor may increase or reduce a frequency, or a number of inputs, of biometric information that may be used, for example, for facial recognition, iris pattern or retina pattern identification, fingerprint identification, or another form of biometric authentication. In general in various implementations, as the safety score indicates a safer environment, the device processor may impose lower authentication requirements and/or less frequent authentications. Similarly, as the safety score indicates a less safe environment, the device processor may impose greater authentication requirements and or more frequent authentications.

In determination block 324, the device processor may determine whether the one or more authentication requirements are satisfied. In some implementations, this determination may involve confirming that each separate authentication is confirmed or successful. In some implementations, this determination may involve determining whether a confidence value generated by one or more authentication methods satisfy an threshold level of confidence. Other methods of determining whether the one or more authentication requirements are satisfied may be used in various implementations.

In response to determining that the one or more authentication requirements are satisfied (i.e., determination block 324="Yes"), the device processor may grant access to one or more functions of the mobile communication device in block 326.

In response to determining that the one or more authentication requirements are not satisfied (i.e., determination block 324="No"), the device processor may deny access to one or more functions of the mobile communication device in block 328. For example, the device processor may deny access to any or all functions of the mobile communication device, including restricting or preventing access to a type or class of application or service, restricting or preventing access to a memory of the mobile communication device, or restricting or preventing access to another function of the mobile communication device. In some implementations, the device processor may restrict or prevent access to one or more applications for information of the mobile communication device, such as email, documents, contacts, wireless communication functions (e.g., cellular, Bluetooth, etc.), near field communication functions, Near Field Communication (NFC) payment functionality, financial information, and other similar information or applications.

In optional block 330, the device processor may perform a security function of the mobile communication device. For example, the device processor may lock the mobile communication device to prevent access to some or all functions or devices of the mobile communication device. In some implementations, the device processor may lock the communication device until the receipt or input of an unlock code or other security information. In some implementations, the device processor may send a message (such as an alarm or other notification) to for example, a known peer device, or a most recently seen peer device. In some implementations, the message may include a location of the wireless communication device, which may allow the wireless communication device to be located. In some implementations, the device processor may encrypt communications (such as voice communications, data communications, messaging, etc.). In some implementations, the device processor may restrict or prevent electronic communications to, for example, known and/or frequent contacts. Other implementations of security functions that the device processor may perform are possible.

The device processor may perform the operations of the method 300 periodically, by again determining environment context information in block 302 (e.g., following operations in blocks 326, 328 or 330), and repeating the operations in blocks 304-330 as described. In various implementations, the device processor may periodically redetermine the safety score of the mobile communication device based on more recent or more current information, including updated environment context information, an updated survey of detectable peer devices, and/or updated safety information from one or more peer devices.

Figure 3B:
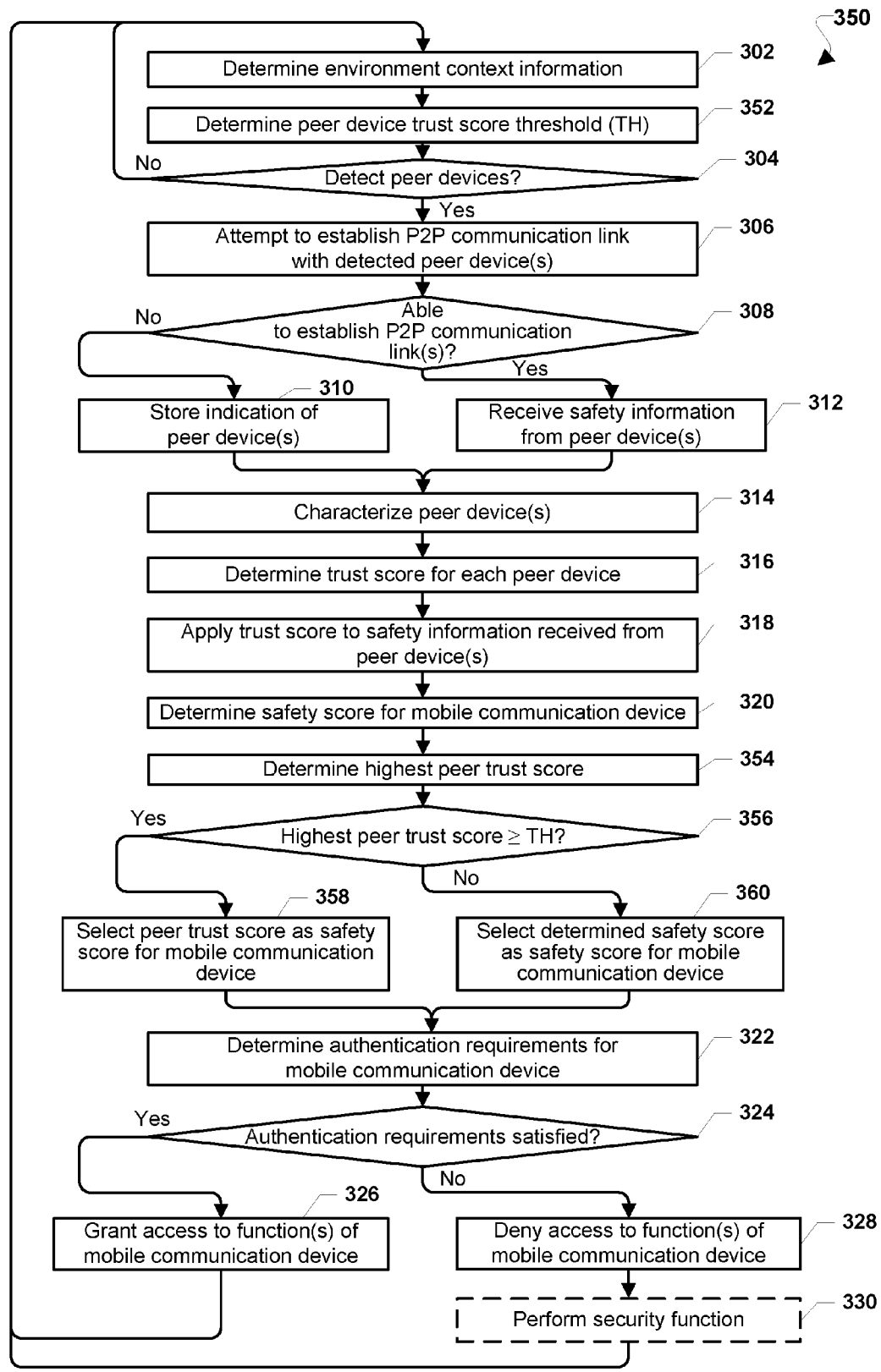

FIG. 3B is a process flow diagram illustrating a method 350 for managing security for a mobile communication device according to some implementations. With reference to FIGS. 1-3B, the method 350 may be implemented by a processor (such as the general-purpose processor 206, the baseband processor 216, or another similar processor) of a mobile communication device (such as the mobile communication devices 102 and 200). In blocks 302-330, the device processor may perform operations of like numbered blocks of the method 300 described with reference to FIG. 3A.

In some situations, a safety score calculated by the device processor may not accurately reflect the trustworthiness of the environment of the mobile communication device. For example, an owner of the mobile communication device may attend a cocktail party or a large work meeting at which the device processor may detect numerous unrecognized (and therefore untrusted) mobile communication devices. Based on the number and/or proximity of the unrecognized mobile communication devices, the device processor may determine a relatively low safety score. By use of a peer device trust score threshold, the device processor may counterbalance an otherwise relatively low safety score in certain circumstances.

In block 352, the device processor may determine a peer device trust score threshold (TH). In some implementations, the device processor may determine the peer device trust score threshold based on user input. For example, the device processor may receive an input of the peer device trust score threshold value. As another example, the device processor may receive an input activating use of the peer device trust score threshold. In some implementations, the device processor may determine the peer device trust score threshold based on the detection or proximity of one or more highly trusted peer devices (e.g., a peer device of a close friend, trusted colleague, family member, and the like).

In block 354, the device processor may determine the highest peer trust score from among the detected peer devices. For example, the detected peer devices may include a peer device associated with close friend or trusted colleague, and the trust score determined for such peer device may be the highest peer trust score.

In determination block 356, the device processor may determine whether the highest peer trust score is greater than or equal to the peer device trust score threshold.

In response to determining that the highest peer trust score is greater than or equal to the peer device trust score threshold (i.e., determination block 356="Yes"), the device processor may select the peer trust score as the safety score for the mobile communication device in block 358.

In response to determining that the highest peer trust score is not greater than or equal to the peer device trust score threshold (i.e., determination block 356="No"), the device processor may select the safety score that is determined by the device processor (block 320) as the safety score for the mobile communication device in block 360.

The device processor may then use the selected safety score to determine the one or more authentication requirements for the mobile communication device in block 322 and continue with the operations in blocks 324-330 of the method 300 as described with reference to FIG. 3A.

In some implementations, the device processor may determine the safety score $S_i$ according to the following equation (4):

$$\text{if } \max(\{w(i,j)s_j : j = 1, \ldots, N\}) \geq TH, \text{ then} \quad \text{[Equation 4]}$$
$$S_i = \max(\{w(i,j)s_j : j = 1, \ldots, N\}), \text{ else}$$
$$S_i = \frac{\sum_j s_j w(i,j) b(i,j) - \sum_m u(i,m) b(i,m)}{\sum_j s_j C_b + \sum_m C_b}.$$

In some implementations, the peer device trust score threshold may have a range of {0,1}, in which a higher value represents a higher threshold.

For example, an owner of the mobile communication device may visit a close friend's family, an environment in which the mobile communication device may detect a peer device of the close friend (i.e., a trusted peer device) and numerous unrecognized mobile communication devices (i.e., untrusted peer devices). The mobile communication device may determine a relatively low peer device trust score threshold (e.g., based on a user input). The device processor of the mobile communication device may determine a high trust score for the friend's peer device, and a low trust score for each of the unrecognized mobile communication devices. The highest peer trust score would thus be the trust score associated with the friend's peer device. The device processor may then compare the highest peer trust score to the peer device trust score threshold. In response to determining that the highest peer trust score is greater than or equal to the peer device trust score threshold, the device processor may select the trust score of the friend's peer device as the safety score for the mobile communication device. In response to determining that the highest peer trust score is not greater than or equal to the peer device trust score threshold, the device processor may select a safety score determined by the device processor as the safety score for the mobile communication device.

Figure 4:
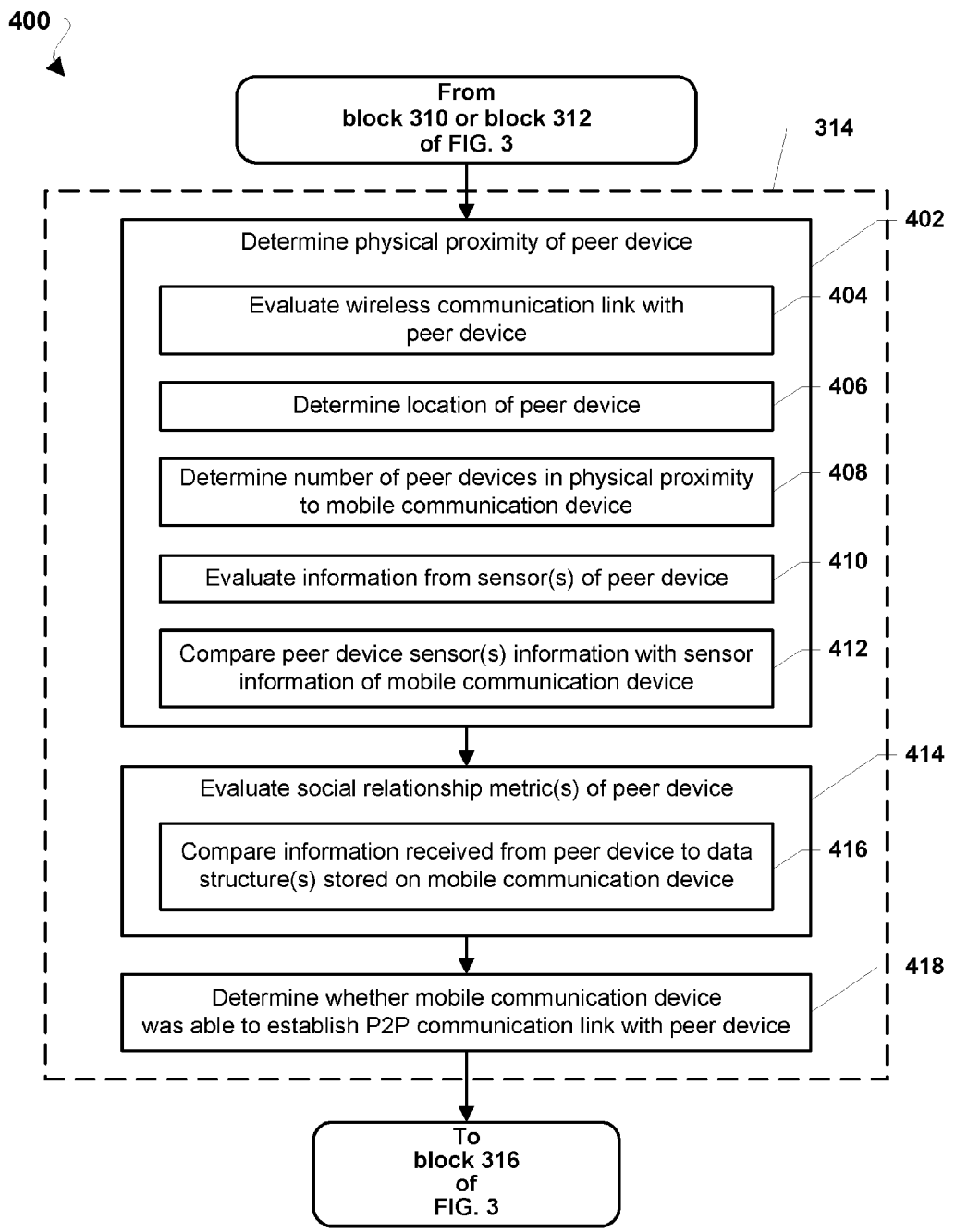
FIG. 4 is a process flow diagram illustrating a method of managing security for mobile communication device according to various implementations.

FIG. 4 is a process flow diagram illustrating a method 400 for managing security for a mobile communication device according to some implementations. The method 400 illustrates an example of operations that may be performed in block 314 of the method 300 as described with reference to FIG. 3 according to some implementations. With reference to FIGS. 1-4, the method 400 may be implemented by a processor (such as the general-purpose processor 206, the baseband processor 216, or another similar processor) of a mobile communication device (such as the mobile communication devices 102 and 200).

In block 314, a processor of the mobile communication device (a "device processor") may characterize each of the one or more peer devices. In some implementations, the device processor may characterize each of the detected peer devices based on one or more criteria.

For example, in block 402, the device processor may determine the physical proximity of a peer device to the mobile communication device. The device processor may evaluate a peer device's physical proximity using a variety of criteria.

In block 404, the mobile communication device may evaluate the wireless communication link with the peer device. In some implementations, the mobile communication device may evaluate a signal strength of the wireless communication link with a peer device. The device processor may also determine an attenuation of the wireless communication link with the peer device. The device processor may also determine a level or degree of noise in the wireless communication link with the peer device. In various embodiments, the signal strength, attenuation, and/or noise level of the wireless communication link may indicate, for example, a physical distance between peer device to the wireless communication device, as well as whether an object or person may be interposed between the wireless communication device and the peer device. In various implementations, the device processor may characterize the peer device based on the peer device's physical proximity (e.g., as may be indicated by one or more of the signal strength, attenuation, and/or noise level of the wireless communication link).

In block 406, the device processor may determine a location of a peer device. The location of the peer device may be determined, for example, using Global Positioning System (GPS) or other location information that may be provided by the peer device. In some implementations, the device processor may determine a date, time, time zone, and other information of the peer device. In some implementations, the device processor may compare such information of the mobile communication device to the determined information of the peer device. In various implementations, the device processor may characterize the peer device based on the location and/or time information of the peer device, either alone or in comparison to such information of the mobile communication device.

In block 408, the device processor may determine a number of peer devices in physical proximity. This information may be used by the device processor to determine whether the mobile communication device is relatively isolated or in a relatively crowded environment.

In block 410, the device processor may evaluate information from one or more sensors of the peer device. In some implementations, the device processor may characterize the peer device based on the information from the one or more sensors of the peer device. For example, the device processor may determine one or more environmental conditions of the peer device, such as ambient sounds, lighting conditions, atmospheric conditions, and other environmental conditions of the peer device that may be determined from sensor information of the peer device.

In block 412, the device processor may compare information from the one or more sensors of the peer device to sensor information of the wireless communication device. Based on such comparisons, the device processor may determine whether the mobile communication device and the peer device by detecting similar or different information about their respective environments. In some implementations, such comparison may provide an indication of physical proximity between the mobile communication device and the peer device.

In block 414, the device processor may evaluate one or more social relationship metrics of the peer device. In such implementations, the device processor may characterize the peer device based on the one or more social relationship metrics. For example, the device processor may determine and evaluate a social relationship between the mobile communication device and the peer device. In some implementations, the device processor may characterize the peer device based on a sliding scale of social relationship metrics, or along a graduated scale of social relationship metrics. In some implementations, the device processor may characterize the peer device in a discrete characterization of a social relationship (e.g., "friend device," "family device," "co-worker device," "acquaintance device," "unknown device," "not in any peer group of the mobile communication device," or another characterization of a social relationship). Other implementations are also possible.

In block 416, the device processor may compare information received from the peer device to a data structure (or data structures) stored on the mobile communication device including information that may indicate an association between the mobile communication device and the peer device. In some implementations, the device processor may evaluate social connections between the mobile communication device and the peer device.

For example, the data structure may include a contact list, an address book, or another listing including information that may indicate an association between the mobile communication device and the peer device. The data structure may also include a presence of, number of, and/or frequency of social media site information and/or interactions, which may include comments, posts, links, references, messages, and the like on social media sites indicating an association between the mobile communication device and the peer device. The data structure may also include a presence of peer device phone number in call or message logs of the mobile communication device, a number and/or frequency of communications (such as phone calls, text messages, emails, and the like). For example, the device processor may analyze information received from the peer device to determine whether the peer device is associated with a family member, friend, or colleague of a user of the mobile communication device. Relationships that may indicate a closer degree of social connection may result in a higher social relationship metric.

The data structure may also include information indicating a duration that the mobile communication device and the peer device have been associated, or engage in communication. For example, the data structure may indicate a period of time that the mobile communication device in the peer device have been associated, or a date on which contact information of the peer device was stored in a memory of the mobile communication device and/or the peer device. The data structure may also include call logs, the timing of sending and/or receipt of messages, and similar information that may indicate a degree of social relationship between the devices. For example, the data structure may also include durations of conversations or communication sessions between the mobile communication device and the peer device. Relatively long conversations or communication sessions may indicate a closer degree of social connection, and thus may result in a higher social relationship metric.

The data structure may also include the presence of and/or activity of an application installed on the mobile communication device and the peer device to enable application-to-application communication between the mobile communication device and the peer device. Examples of an application that may enable such application-to-application communication include What's App, Apple Facetime, Google Duo, and other similar software, services, or applications. The presence of and/or level of activity of such application(s) may results in a higher social relationship metric.

The data structure may also include one or more records of synchronization of information (such as contacts, calendar info, and other information) between the mobile communication device and the peer device. For example, calendar information may indicate similar or matching entries (such as meetings, appointments, trips, classes, social events, and the like) on the mobile communication device and the peer device. Such information may results in a higher social relationship metric.

In block 418, the device processor may determine whether the mobile communication device was able to establish a P2P communication link with the peer device. In some implementations, the device processor may determine whether a communication link request from the mobile communication device was previously refused by the peer device, or whether a communication link request from the peer device was previously refused by the mobile communication device. An indication of any or all of such cases may result in a lower social relationship metric.

In block 316, the device processor may determine a trust score for the peer device based upon all of the information gathered in blocks 402-418.

Various implementations enable a device processor of the mobile communication device to manage security for the mobile communication device. Various implementations improve the function of the mobile communication device by enabling the device processor to dynamically evaluate and manage security of the mobile communication device based on, among other things, information about the environment of the mobile communication device and information provided by one or more peer devices in communication with the mobile communication device. Further, various implementations improve the function of the mobile communication device by enabling the device processor to determine and adjust one or more authentication requirements for the mobile communication device based on periodically updated information about the environment context, and about and from peer devices. Various implementations also improve the function of the mobile communication device by dynamically adjusting access to one or more functions of the mobile communication device based on environment context information and information about and from peer devices. Various implementations also determine and adjust one or more authentication requirements for the mobile communication device based on information about the environment of the mobile communication device, and information provided by one or more peer devices in communication with the mobile communication device. Thus, the various embodiments enable a mobile communication device processor to use information from peer devices, and from devices that are peer devices to the mobile communication device's peer device, to manage security of the mobile communication device.

Figure 5:
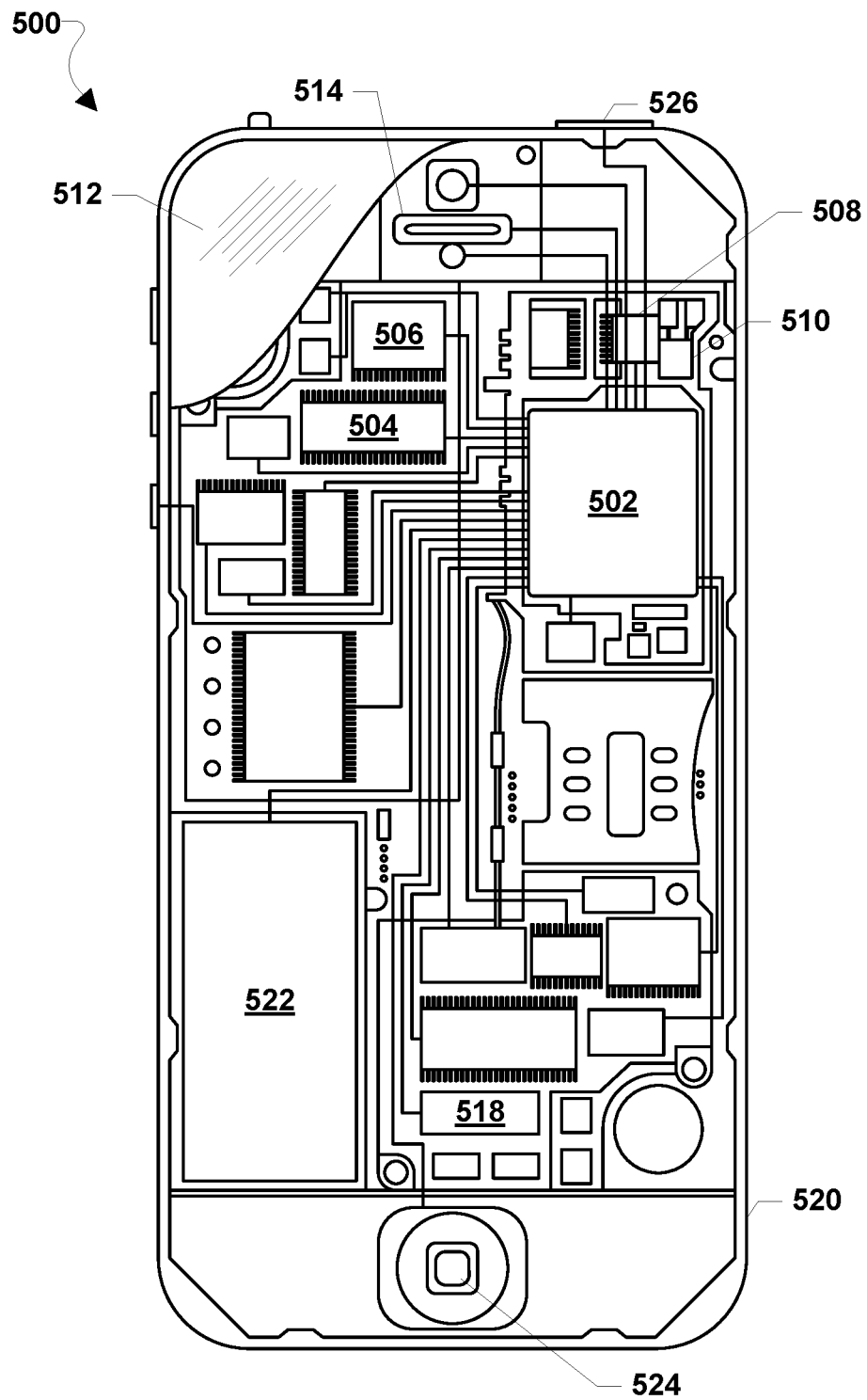
FIG. 5 is a component block diagram illustrating a mobile communication device suitable for use with various implementations.

Various embodiments may be implemented within a variety of mobile communication devices. FIG. 5 illustrates a component block diagram of a mobile wireless communication device 500 suitable for use with various implementations. With reference to FIGS. 1-5, the mobile wireless communication device 500 may include a processor 502 coupled to a touchscreen controller 506 and an internal memory 504. The processor 502 may be one or more multi-core integrated circuits designated for general or specific processing tasks. The internal memory 504 may be volatile or non-volatile memory, and may also be secure and/or encrypted memory, or unsecure and/or unencrypted memory, or any combination thereof. The touchscreen controller 506 and the processor 502 may also be coupled to a touchscreen panel 512, such as a resistive-sensing touchscreen, capacitive-sensing touchscreen, infrared sensing touchscreen, etc. Additionally, the display of the mobile wireless communication device 500 need not have touch screen capability.

The mobile wireless communication device 500 may have two or more radio signal transceivers 508 (e.g., Peanut, Bluetooth, Zigbee, Wi-Fi, radio frequency (RF), etc.) and antennae 510, for sending and receiving communications, coupled to each other and/or to the processor 502. The transceivers 508 and antennae 510 may be used with the above-mentioned circuitry to implement the various wireless transmission protocol stacks and interfaces. The mobile wireless communication device 500 may include one or more cellular network wireless modem chip(s) 516 coupled to the processor and antennae 510 that enables communication via two or more cellular networks via two or more radio access technologies.

The mobile wireless communication device 500 may include a peripheral wireless device connection interface 518 coupled to the processor 502. The peripheral wireless device connection interface 518 may be singularly configured to accept one type of connection, or may be configured to accept various types of physical and communication connections, common or proprietary, such as USB, FireWire, Thunderbolt, or PCIe. The peripheral wireless device connection interface 518 may also be coupled to a similarly configured peripheral wireless device connection port (not shown).

The mobile wireless communication device 500 may also include speakers 514 for providing audio outputs. The mobile wireless communication device 500 may also include a housing 520, constructed of a plastic, metal, or a combination of materials, for containing all or some of the components discussed herein. The mobile wireless communication device 500 may include a power source 522 coupled to the processor 502, such as a disposable or rechargeable battery. The rechargeable battery may also be coupled to the peripheral wireless device connection port to receive a charging current from a source external to the mobile wireless communication device 500. The mobile wireless communication device 500 may also include a physical button 524 for receiving user inputs. The mobile wireless communication device 500 may also include a power button 526 for turning the mobile wireless communication device 500 on and off.

The processor 502 may be any programmable microprocessor, microcomputer or multiple processor chip or chips that can be configured by software instructions (applications) to perform a variety of functions, including the functions of various embodiments described below. In some mobile wireless devices, multiple processors 502 may be provided, such as one processor dedicated to wireless communication functions and one processor dedicated to running other applications. Typically, software applications may be stored in the internal memory 504 before they are accessed and loaded into the processor 502. The processor 502 may include internal memory sufficient to store the application software instructions.

Various implementations illustrated and described are provided merely as examples to illustrate various features of the claims. However, features shown and described with respect to any given implementation are not necessarily limited to the associated implementation and may be used or combined with other implementations that are shown and described. Further, the claims are not intended to be limited by any one example implementation. For example, one or more of the operations of the methods 300 and 400 may be substituted for or combined with one or more operations of the methods 300 and 400.

The foregoing method descriptions and the process flow diagrams are provided merely as illustrative examples and are not intended to require or imply that the blocks of various implementations must be performed in the order presented. As will be appreciated by one of skill in the art the order of blocks in the foregoing implementations may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the implementations disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the implementations disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various implementations, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed implementations is provided to enable any person skilled in the art to make or use the present implementations. Various modifications to these implementations will be readily apparent to those skilled in the art, and the generic principles defined herein may be applied to other implementations without departing from the spirit or scope of the implementations. Thus, various implementations are not intended to be limited to the implementations shown herein but are to be accorded the widest scope consistent with the following claims and the principles and novel features disclosed herein.

What is claimed is:

1. A method of managing security for a mobile communication device, comprising:
   determining, by the mobile communication device, environment context information;
   receiving, at the mobile communication device, safety information from one or more peer devices, wherein the safety information includes information from one or more sensors of the one or more peer devices;
   determining a safety score for the mobile communication device based on the received safety information and the determined environment context information;
   determining an authentication requirement for the mobile communication device based on the determined safety score; and
   denying access to a function of the mobile communication device in response to determining that the determined authentication requirement is not satisfied.

2. The method of claim 1, further comprising:
   characterizing the one or more peer devices; and
   determining a trust score for each of the one or more peer devices based on characterizations of each peer device.

3. The method of claim 2, further comprising:
   applying the trust score for each of the one or more peer devices to the safety information received from the respective peer device.

4. The method of claim 2, wherein characterizing the one or more peer devices comprises characterizing the one or more peer devices based on a physical proximity of the one or more peer devices.

5. The method of claim 2, wherein characterizing the one or more peer devices comprises characterizing the one or more peer devices based on one or more social relationship metrics of the one or more peer devices.

6. The method of claim 1, further comprising:
   determining a trust score for each of the one or more peer devices based on characterizations of each peer device; and
   applying the trust score for each of the one or more peer devices to the safety information received from the respective peer device.

7. The method of claim 6, wherein determining the safety score for the mobile communication device based on the received safety information and the determined environment context information comprises:
   determining the safety score based on the safety information to which the respective trust score has been applied.

8. The method of claim 1, further comprising:
   determining a trust score for each of the one or more peer devices based on characterizations of each peer device;
   determining a safety score for the mobile communication device based on the received safety information and the determined environment context information;
   comparing a highest trust score to a trust score threshold;
   selecting the highest trust score as the safety score for the mobile communication device in response to determining that the highest trust score is greater than or equal to the trust score threshold; and
   selecting the determined safety score as the safety score for the mobile communication device in response to determining that the highest trust score is not greater than or equal to the trust score threshold.

9. A mobile communication device, comprising:
   a radio frequency transceiver;
   one or more sensors; and
   a processor coupled to the radio frequency transceiver and the one or more sensors and configured with processor-executable instructions to:
   determine environment context information;
   receive safety information from one or more peer devices, wherein the safety information includes information from one or more sensors of the one or more peer devices;
   determine a safety score for the mobile communication device based on the received safety information and the determined environment context information;
   determine an authentication requirement for the mobile communication device based on the determined safety score; and
   deny access to a function of the mobile communication device in response to determining that the determined authentication requirement is not satisfied.

10. The mobile communication device of claim 9, wherein the processor is further configured with processor-executable instructions to:
    characterize the one or more peer devices; and
    determine a trust score for each of the one or more peer devices based on characterizations of each peer device.

11. The mobile communication device of claim 10, wherein the processor is further configured with processor-executable instructions to:
apply the trust score for each of the one or more peer devices to the safety information received from the respective peer device.

12. The mobile communication device of claim 10, wherein the processor is further configured with processor-executable instructions to characterize the one or more peer devices by characterizing the one or more peer devices based on a physical proximity of the one or more peer devices.

13. The mobile communication device of claim 10, wherein the processor is further configured with processor-executable instructions to characterize the one or more peer devices by characterizing the one or more peer devices based on one or more social relationship metrics of the one or more peer devices.

14. The mobile communication device of claim 9, wherein the processor is further configured with processor-executable instructions to:
determine a trust score for each of the one or more peer devices based on characterizations of each peer device; and
apply the trust score for each of the one or more peer devices to the safety information received from the respective peer device.

15. The mobile communication device of claim 14, wherein the processor is further configured with processor-executable instructions to determine the safety score for the mobile communication device based on the received safety information and the determined environment context information by:
determining the safety score based on the safety information to which the respective trust score has been applied.

16. The mobile communication device of claim 9, wherein the processor is further configured with processor-executable instructions to:
determine a trust score for each of the one or more peer devices based on characterizations of each peer device;
determine a safety score for the mobile communication device based on the received safety information and the determined environment context information;
compare a highest trust score to a trust score threshold;
select the highest trust score as the safety score for the mobile communication device in response to determining that the highest trust score is greater than or equal to the trust score threshold; and
select the determined safety score as the safety score for the mobile communication device in response to determining that the highest trust score is not greater than or equal to the trust score threshold.

17. A non-transitory processor-readable storage medium having stored thereon processor-executable instructions configured to cause a processor of a mobile communication device to perform operations comprising:
determining environment context information;
receiving safety information from one or more peer devices, wherein the safety information includes information from one or more sensors of the one or more peer devices;
determining a safety score for the mobile communication device based on the received safety information and the determined environment context information;
determining an authentication requirement for the mobile communication device based on the determined safety score; and
denying access to a function of the mobile communication device in response to determining that the determined authentication requirement is not satisfied.

18. The non-transitory processor-readable storage medium of claim 17, wherein the stored processor-executable instructions are configured to cause the processor of the mobile communication device to perform operations further comprising:
characterizing the one or more peer devices; and
determining a trust score for each of the one or more peer devices based on characterizations of each peer device.

* * * * *